United States Patent [19]

Sullivan

[11] Patent Number: 4,962,070
[45] Date of Patent: Oct. 9, 1990

[54] NON-POROUS METAL-OXIDE COATED CARBONACEOUS FIBERS AND APPLICATIONS IN CERAMIC MATRICES

[76] Inventor: Thomas M. Sullivan, 3953 Oregon St., San Diego, Calif. 92104

[21] Appl. No.: 125,221

[22] Filed: Nov. 25, 1987

Related U.S. Application Data

[63] Continuation-in-part of Ser. No. 793,274, Oct. 1, 1985, abandoned.

[51] Int. Cl.$^5$ .................. C04B 35/80; C04B 35/84
[52] U.S. Cl. .................................. 501/95; 428/367; 428/384; 428/389; 428/690
[58] Field of Search ............... 501/95; 428/384, 389, 428/367, 690; 264/DIG. 19

[56] References Cited

U.S. PATENT DOCUMENTS

| | | | |
|---|---|---|---|
| 2,699,415 | 1/1955 | Nachtman | 154/91 |
| 3,493,403 | 2/1970 | Tung et al. | 501/34 |
| 3,671,285 | 6/1972 | Prescott | 117/75 |
| 3,736,109 | 5/1973 | Darling et al. | 29/195 |
| 3,871,834 | 3/1975 | Kuniya et al. | 29/183 |
| 4,314,852 | 2/1982 | Brennan et al. | 501/88 |
| 4,376,803 | 3/1983 | Katzman | 428/408 |
| 4,500,602 | 2/1985 | Patten et al. | 428/408 |
| 4,585,696 | 4/1986 | Dustmann et al. | 428/375 |

FOREIGN PATENT DOCUMENTS

| | | | |
|---|---|---|---|
| 252046 | 1/1988 | European Pat. Off. | 428/690 |
| 59-156972 | 9/1984 | Japan | 501/95 |
| 1219572 | 1/1971 | United Kingdom | 428/384 |

*Primary Examiner*—Mark L. Bell
*Assistant Examiner*—Anthony J. Green
*Attorney, Agent, or Firm*—H. Jay Spiegel

[57] ABSTRACT

Non-porous metal oxide-coated carbonaceous fibers capable of withstanding chemical degradation at temperatures above 1600° C. and that are particularly useful in the construction of ceramic or metal composites without carbon-carbide hypereutectic formation or micro-cracking in metal and ceramic matrix composites, respectively, but with good interfacial bonding, thereby allowing the same to be favorably employed in space reentry vehicles, heat shields, high-performance aircraft, internal combustion engines, and the like.

7 Claims, No Drawings

NON-POROUS METAL-OXIDE COATED CARBONACEOUS FIBERS AND APPLICATIONS IN CERAMIC MATRICES

CROSS-REFERENCE TO RELATED APPLICATION

This application is a continuation-in-part of application Ser. No. 793,274, filed Oct. 1, 1985, abandoned.

BACKGROUND OF THE INVENTION

In the past ten years, there has been a surge in the development of materials suitable for withstanding high temperatures, particularly those that are encountered in space reentry vehicles, rocket nozzles, turbines, internal combustion engines and the like. Materials used for such applications should exhibit high-temperature strength and resistance to thermal shock, as well as the ability to resist abrasion. Two key properties that must be displayed by such materials are (1) resistance to chemical degradation, particularly oxidation and/or reduction at such temperatures, and (2) sufficient thermal conductivity to diffuse thermal stress. Materials that have considerable potential for high-temperature applications are ceramic or metal matrix composites. To date, however, neither type of composite has been developed with significant mechanical strength at temperatures much above 1200° C.–1400° C.

Considerable effort is presently being expended to extend the useful range of ceramic or metal matrix composites. One approach has been to reinforce composites with fibrous material. Light-weight carbonaceous fibers are particularly attractive because they can be fabricated in a wide variety of tensile strengths and moduli of elasticity. Moreover, the thermal conductivity of these fibers is eight times that of copper and the fibers also exhibit a slightly negative coefficient of thermal expansion.

While carbonaceous fibers composed of carbon, carbides, or graphite have proven to increase the useful mechanical properties of resin matrix composites and some metal matrix composites, they nevertheless do not confer stability much beyond 1500° C. In part, this is because the matrices of such composites readily degrade carbonaceous fibers during composite fabricating. Fabrication must often be performed at significantly higher temperatures than those compatible with the otherwise useful carbonaceous fibers. Thus carbonaceous fibers are of limited use in high-temperature applications because of the tendency of these fibers to deteriorate. For instance, graphite fibers can withstand temperatures approaching 2200° C. in vacuum but oxidize readily in the air above 316° C. and unprotected graphite fibers at temperatures above 1350° C.–1500° C. in a SiAlON matrix are readily destroyed during composite fabrication.

Attempts to prevent oxidation of carbonaceous fibers have met with limited success. One approach has been to coat carbon fibers with silicon carbide, which in turn provides a secondary layer of silicon dioxide as a shield over the silicon carbide primary coating. This procedure works well at temperatures below 1200° C. Above this temperature, however, silicon dioxide undergoes a phase change and there is a loss of protection for the underlying carbonaceous fiber.

As noted above, carbonaceous fibers display superior thermal conductivity properties. Ceramics reinforced with carbonaceous fibers enjoy improved resistance to thermomechanical shock because the fibers conduct heat away from the site of impact. However, at high temperatures carbonaceous fibers are oxidized or reduced, and consequently fiber reinforced ceramic composites in which they are incorporated undergo premature catastrophic failure. Thus, in order to take further advantage of carbonaceous fibers in fabricating fiber reinforced ceramic or metal matrix composites, it is desirable that methods of shielding the fibers from chemical degradation at high temperatures be developed.

U.S. Pat. No. 4,376,803 describes a method for coating carbon fibers that can be used in metal matrix composites. The coated carbon fibers are not useful at high temperatures because they are (1) coated with metal oxides having low melting temperatures, such as oxides of silicon, titanium, vanadium, lithium, sodium, potassium, zirconium or boron or (2) coated with a high melting temperature oxide such as magnesium oxide that is applied by a method that forms a porous oxide coating about the fibers. Fibers produced by the latter method are not suitable for high temperature applications because oxygen diffuses through the pores resulting in oxidation of the fibers.

Considering the enhanced properties that ceramic or metal composite matrices reinforced with carbonaceous fibers display, it is particularly desirable to develop a process for protecting such fibers so that they are resistant to chemical destruction at high temperatures.

SUMMARY OF THE INVENTION

In its broadest form, the invention herein comprises a non-porous metal oxide coating capable of withstanding degradation at temperatures above 1600° C. which facilitates using carbonaceous fibers in ceramic or metal matrices. In order to prevent the oxidation of carbonaceous fibers and, additionally, enhance the structurally interactive properties of the fibers with composite matrices at high temperatures, the fibers are coated using techniques that yield a non-porous layer of a suitable metal oxide having a thickness of at least about 250 angstroms and which is stable in surface-to-surface contact with carbonaceous compounds at temperatures greater than 1600° C.

A variety of metal oxides have the requisite high temperature stability, and these include oxides of metals from Groups IIA, IIIA, IIIB and IVB of the Periodic Table. The metal oxides can be used to coat carbonaceous fibers of carbon, graphite, or carbide. The coated fibers may be employed in composites with ceramic or metal matrices composed of a number of materials. Examples of materials suitable for ceramic matrices include oxides, borides, carbides, carboxides, nitrides, oxynitrides or carbonitrides, while metal matrices can be composed of iron, cobalt, nickel, vanadium and other metals having similar properties.

Furthermore, metal oxide-coated carbonaceous fibers can, if required by the application envisioned for the fibers, be secondarily coated with a surface-active metal or dopant that enhances the wetting characteristics of the fiber and increases the interfacial bonding of the fibers with the matrix materials.

DETAILED DESCRIPTION OF THE INVENTION

The subject invention comprises non-porous metal oxide-coated carbonaceous fibers exhibiting several advantages over carbonaceous fibers shielded by other means: first, the fibers are practically impervious to oxidizing or reducing radicals at temperatures up to 2300° C.; second, they do not diffuse into the matrix or the fiber at high temperature; and third, they provide a surface capable of intermediate interfacial bonding with matrix materials resulting in good composite translational strength.

Carbonaceous fibers composed primarily of carbon, graphite, or a carbide can be coated with a multiplicity of metal oxides. An example of a suitable carbide is silicon carbide, which can be obtained commercially as either multifiber or monofiber material. In addition to silicon carbide, a variety of other carbonaceous fibers can be utilized. For example, one can use boron carbide as described in U.S. Pat. Nos. 3,398,013 and 3,294,880, and French Patent No. 1,511,672; transition element carbides as described in U.S. Pat. Nos. 3,269,802 and 3,433,725; or carbonitride fibers as described in U.S. Pat. No. 4,097,294. Other carbides which can be used include the carbides of tungsten, niobium, tantalum, uranium, zirconium, hafnium, titanium, beryllium and vanadium.

A number of metal oxides are suitable for forming a non-porous high temperature shield about a carbonaceous fiber. Particularly useful metal oxides are MgO and BeO, as well as a number of oxides of metals of Groups II, IIIA, IIIB (other than oxides of actinides other than Thorium) and IVB of the Periodic Table. An example of a preferred metal oxide is yttria, which is particularly favored for its hightemperature stability. Thus, the following elements are among those suitable for forming metal oxide shields: Be and Mg (Group IIA); Al (Group IIIA); Sc, Y, La, the lanthanides and Th (Group IIIB); and Zr and Hf (Group IVB).

It is anticipated that the minimum effective metal oxide coating thickness will be about 250 angstroms, but thicker coatings of up to 1000 angstroms or more will be preferred for use in particular instances. An example would be in the fabrication of pressed fiber composites or, alternatively, when the fabrication process itself dictates that the coating be significantly greater than the minimum effective thickness. The 250 angstrom minimum effective coating thickness is obtainable by manufacturing techniques well-known to those in the art. Care should be taken to insure that the coating is continuous (non-porous) over the fiber.

While carbonaceous fibers can be coated with a wide variety of metal oxides to form a chemical shield capable of preventing oxidation and/or reduction of the fibers, several factors will be determinative of the choice of metal oxide. Cost will be a consideration as the expense of different metal oxides differs widely. Another factor will be the interfacial bond lives between fiber and coating and between coating and matrix at expected service temperatures. Also important will be other properties such as toxicity. For example, MgO is inexpensive and is stable in the presence of carbon at temperatures up to 1800° C., while BeO is expensive and toxic but stable at higher temperatures, up to about 2300° C. The Group IIIB metal oxide, thorium oxide, is similarly expensive and stable at temperatures of about 2000° C., but radioactive. Thus, in those instances where metal oxide-coated carbonaceous fibers are sought to be employed in ceramic or metal matrices for applications at temperatures about 1800° C. where cost is not a factor, BeO or thorium oxide might be preferred; whereas at temperatures below 1800° C., the more economical MgO would be favored.

Several well-known techniques can be utilized for coating carbonaceous fibers. For at least two reasons the preferred technique is chemical vapor deposition. First, this process can be carried out at temperatures that minimize heat dependent reactions between metal oxide coating precursors and the carbonaceous fibers. Second, chemical vapor deposition deposits a metal oxide coating, that is non-porous (continuous) about the carbonaceous fiber. The latter is necessary for the fibers to withstand the high temperature applications for which they are intended. The non-porous nature of the deposited metal oxide layer prevents oxygen from diffusing into, contacting and oxidizing the underlying fibers. Suitable chemical vapor deposition techniques are described by Bunshah in *Deposition Technologies for Films and Coatings* (Knowles Publications, N.J. 1982).

Alternatively, fibers can be coated by first dissolving the metal oxide in a colloidal suspension wherein the suspension consists of a volatile solution that is contacted with the carbonaceous fiber. Subsequently the solution is volatilized leaving the metal oxide in place on the carbonaceous fiber. The metal oxide is then sintered to eliminate porosity. Another procedure that may be preferred in certain instances is to coat the carbonaceous fibers with metal directly and form the metal oxide by subsequent exposure to an oxidizing environment that forms the metal oxide but does not oxidize the underlying fiber. This procedure is described in U.S. Pat. No. 3,736,109, particularly as applied to forming a coating of MgO by oxidation of magnesium metal. Regardless of the procedure used, it is important to control the temperature so as not to oxidize the fiber prior to or during application of the metal oxide coating.

It will be appreciated that not all methods of coating carbonaceous fibers will form a non-porous layer of metal oxide about the fibers absent additional processing steps. This is particularly true where the metal oxide is applied in the form of a gel or colloid. In these instances, the metal oxide should be sintered at temperatures of about 1400°–1600° C. which has the effect of eliminating pores present in the oxide layer.

MgO has been shown in U.S. Pat. No. 4,376,803, to be suitable for coating carbonaceous fibers having low temperature applications. I have discovered that MgO is suitable for coating carbonaceous fibers having high temperature applications provided that the MgO is sintered at high temperatures, particularly between 1400° C. and 1700° C.

The metal-oxide coated carbonaceous fibers can be employed in ceramic matrices consisting of materials that are well-known to those skilled in the art and that are commonly used for fabricating monolithic ceramics. Particularly useful are the following materials: BeO, $Al_2O_3$, $Y_2O_3$, $LiAlSi_2O_6$, SiAlON, $Al_6Si_2O_{13}$, $ZrSiO_4$, SiC, $Si_3N_4$, transformation-toughened $ZrO_2$, partially-stabilized $ZrO_2$, transformation-toughened $Al_2O_3$, $Si_3N$-$SiO_2$-$Y_2O_3$, $ThO_2$, $TiB_2$, $ZrB_2$, $HfB_2$, AlON, AlN, $B_4C$, BN, $MgAl_2O_4$, TiC, $Cr_3C_2$, TiN, cordierite, $Fe_2O_3$ and $Fe_3O_4$. Generally, metal oxide coated carbonaceous fibers will make up to 55% by volume of the composite, though pressed fiber composites may benefit by having higher fiber amounts.

In addition to use in ceramic matrices, the coated carbonaceous fibers can similarly be employed in metal matrices. A variety of metals are compatible for combination with metal oxide-coated carbonaceous fibers and these include iron, cobalt, nickel, vanadium, beryllium, titanium, silver, gold, yttrium, niobium, tantalum, rhenium, chromium, molybdenum and tungsten, as well as alloys of these materials.

A variety of methods can be used to combine the metaloxide coated carbonaceous fibers with the matrix material. One method is by hot-pressing a mixture of carbonaceous fibers with matrix components. This procedure is described in U.S. Pat. No. 4,314,852.

Another method is by pressureless sintering in a controlled atmosphere or under vacuum. Still another method is chemical vapor infiltration (CVI) in which coated fiber architecture is infiltrated with gaseous compounds that react at elevated temperature to produce the matrix.

The following examples will illustrate the invention.

EXAMPLE I

MgO-coated Carbon Fiber Reinforced Alumina Ceramic Composite

A layer of MgO more than 250 angstroms thick but less than 1000 angstroms thick is deposited on Amoco Performance Products P55 2K carbon fibers by chemical vapor deposition (CVD). The carbon fibers have $2.5 \times 10^5$ psi ($1.7 \times 10^6$ kPA) tensile strength and $5.5 \times 10^7$ psi ($3.8 \times 10^8$ kPa) tensile modulus. The MgO fiber coating is not porous and covers the entire surface area of each filament because coating is precipitated from a vapor that surrounds the fibers. Substrate temperature and vapor phase densification aids control adhesion of the coating to the carbon fiber. A fiber-reinforced ceramic composite containing up to 55 volume percent coated carbon fibers in an alpha-alumina matrix can be fabricated by hot pressing, pressureless sintering, chemical vapor infiltration, and other well known methods. Hot-pressing a sample with 40 volume percent fibers at up to 1650° C. under 2000 psi (13800 kPa) pressure produces near theoretical density with a unidirectional composite translation strength of $9.1 \times 10^4$ psi ($6.3 \times 10^5$ kPa) at room temperature. The density of the composite is 3.098 g/cm$^3$.

EXAMPLE II

BeO-coated Silicon Carbonitride Fiber Reinforced Silicon Carbonitride Ceramic Composite Silicon carbonitride fibers made by the process of U.S. Pat. No. 4,097,294 in an ammonia atmosphere can be coated with BeO by CVD to impart oxidation resistance and to prevent diffusion into a silicon carbonitride matrix. Fibers are fabricated under tension to control molecular orientation. Highly ordered structure makes fibers of a given material stronger and higher in modulus than monolithic materials. Composite behavior is possible, because the silicon carbonitride fibers are slightly higher in modulus than the silicon carbonitride matrix. Coefficient of thermal expansion mismatch is impossible. Fiber reinforcement of a ceramic matrix of the same chemical content as the fiber (but different crystalline structure) enables selective static properties by means of fiber architecture. Hot pressing or pressureless sintering the composite using densification aids while holding fibers under tension at lower temperature than the critical temperature for the fiber prevents strong bonding between the BeO fiber coating and the silicon carbonitride matrix.

EXAMPLE III

MgO-coated Carbon Fiber Reinforced Iron

MgO is deposited on Amoco Performance Products T40 12K carbon fiber by chemical vapor deposition. The carbon fiber has $8.2 \times 10^5$ psi ($5.6 \times 10^6$ kPa) tensile strength and $4.2 \times 10^7$ psi ($2.9 \times 10^8$ kPa) tensile modulus. Fibers are preheated to 1000°–1300° C. in an evacuated pre-form before casting in an iron matrix. Sizing applied to the coated fibers encourages the molten iron matrix to wet the fiber reinforcement. A composite with 25% volume fraction of fibers has a $1.8 \times 10^5$ psi ($1.2 \times 10^6$ kPa) unidirectional composite tensile strength and a 5.94 g/cm$^3$ composite density. The composite has 0.210 (km/s)$^2$ specific strength compared to 0.054 (km/s)$^2$ for cast iron.

EXAMPLE IV

ThO$_2$-coated Carbon Fiber reinforced W-1 ThO$_2$

Chemical vapor deposition is used to coat carbon fibers such as Amoco Performance Products P75S-2K with ThO$_2$. Thoria is stable in surface-to-surface contact with carbon up to 2000° C. and is also stable is surface-to-surface contact with tungsten up to 2000° C. Tungsten is infiltrated among fibers held in tension and sintered using pressure assured densification at 1500°–1600° C. The resulting composite of 50% volume fraction carbon fibers with 2 g/cm$^3$ density in a tungsten matrix with 19.3 g/cm$^3$ density has a composite density of 10.65 g/cm$^3$. Carbon fiber reinforced tungsten MMC retains greater strength at temperatures approaching 2000° C. than monolithic tungsten because the carbon fibers retain almost all room temperature strength at 2000° C.

We claim:

1. A ceramic matrix composite capable of withstanding chemical degradation at temperatures greater than 1600° C., comprising:
   metal oxide-coated carbonaceous fibers, and
   ceramic matrix material in contact with said metal oxide-coated carbonaceous fibers wherein said metal oxide-coated carbonaceous fibers occupy from greater than 0% up to about 55% by volume of said ceramic matrix composite.

2. A composite as in claim 1 wherein said metal oxide-coated carbonaceous fibers comprise a carbonaceous fiber in contact with a continuous non-porous metal oxide layer at least 250 angstroms thick and composed of materials selected from the group consisting of MgO, BeO, Group IIIB oxides excluding oxides of actinides other than thorium, aluminum oxide, and Group IVB oxides excluding titanium oxide, and alloys thereof.

3. A composite as in claim 1 wherein said carbonaceous fibers are selected from the group consisting of fibers of carbide, graphite or carbon.

4. A composite as in claim 3 wherein said carbide is selected from the group consisting of silicon carbide, tungsten carbide, niobium carbide, tantalum carbide, thorium carbide, uranium carbide, zirconium carbide, hafnium carbide, titanium carbide, boron carbide, beryllium carbide, vanadium carbide, transition element carbides and carbonitride compounds.

5. A ceramic matrix composite capable of withstanding chemical degradation at temperatures greater than 1,600° C., comprising:
   (a) metal oxide-coated carbonaceous fibers comprising a carbonaceous fiber in contact with about a 250-Angstrom thick contiguous non-porous metal oxide layer composed of materials selected from the group consisting of MgO, BeO, Group IIIA oxides excluding oxides of actinides with Atomic Numbers higher than 92, Group IIIB oxides excluding thalium oxide and borium oxide, and Group IVA oxides excluding titanium oxide and alloys thereof; and (b) ceramic matrix material in contact with said metal oxide-coated carbonaceous fibers, said carbonaceous fibers being selected from the group consisting of carbide, graphite or carbon and wherein said metal oxide-coated carbonaceous fibers occupy from greater than 0% up to about 55% by volume of said ceramic matrix composite;

(c) said ceramic matrix being composed of materials selected from the group consisting of metal oxides, oxynitrides, nitrides, borides and carbonitrides.

6. A ceramic matrix composite capable of withstanding chemical degradation at temperatures greater than 1,600° C., comprising:

(a) metal oxide-coated carbonaceous fibers comprising a carbonaceous fiber in contact with about a 250-Angstrom thick contiguous non-porous metal oxide layer composed of materials selected from the group consisting of MgO, BeO, Group IIIA oxides excluding oxides of actinides with Atomic Numbers higher than 92, Group IIIB oxides excluding thalium oxide and borium oxide, and Group IVA oxides excluding titanium oxide and alloys thereof; and (b) ceramic matrix material in contact with said metal oxide-coated carbonaceous fibers, said carbonaceous fibers being selected from the group consisting of carbide, graphite or carbon and wherein said metal oxide-coated carbonaceous fibers occupy from greater than 0% up to about 55% by volume of said ceramic matrix composite;

(c) said ceramic matrix being composed of materials selected from the group consisting of BeO, $Al_2O_3$, $LiAlSi_2O_6$, SiAlON, $Al_6Si_2O_{13}$, $ZrSiO_4$, SiC, $Si_3N_4$, transformation toughened $ZrO_2$, transformation toughened $Al_2O_3$, $Si_3N$-$SiO_2$-$Y_2O_3$, $ThO_2$, $TiB_2$, $ZrB_2$, $HfB_2$, TiC, $Cr_3C_2$, TiN, Cordierite, $Fe_2O_3$, AlN, and $Fe_3O_4$.

7. A ceramic matrix composite capable of withstanding chemical degradation at temperatures greater than 1,600° C., consisting essentially of:

metal oxide-coated carbonaceous fibers, and ceramic matrix material in contact with said metal oxide-coated carbonaceous fibers wherein said metal oxide-coated carbonaceous fibers occupy from greater than 0% up to about 55% by volume of said ceramic matrix composite.

* * * * *